United States Patent [19]

Bergles

[11] 4,378,222

[45] Mar. 29, 1983

[54] DERAILLER SYSTEM FOR A BICYCLE

[75] Inventor: Eduard Bergles, Graz, Austria

[73] Assignee: Fichtel & Sachs AG, Schweinfurt, Fed. Rep. of Germany

[21] Appl. No.: 175,448

[22] Filed: Aug. 5, 1980

[30] Foreign Application Priority Data

Aug. 17, 1979 [DE] Fed. Rep. of Germany ....... 2933361

[51] Int. Cl.³ ............................................... F16H 7/22
[52] U.S. Cl. ...................................................... 474/82
[58] Field of Search .................................... 474/80, 82

[56] References Cited

U.S. PATENT DOCUMENTS 4,030,375 6/1977 Nagano ................................. 474/82
4,305,711 12/1981 Lannoch ............................... 474/82

FOREIGN PATENT DOCUMENTS 2056593 3/1981 United Kingdom .................. 474/82

Primary Examiner—Allan D. Hermann
Attorney, Agent, or Firm—Toren, McGeady and Stanger

[57] ABSTRACT

A derailler system for a bicycle including a sprocket system having a plurality of drive sprockets and a chain for driving a wheel of the bicycle at different speeds is shifted by actuation of a movable carrier member having an idler sprocket rotatably mounted thereon for selectively shifting the chain into engagement individually with the drive sprockets. A guide system for guiding movement of the carrier member along a path essentially parallel with the axis of the driven wheel to urge the chain between individual sprockets is provided, with the guide system including a first and a second part thereof movable relative to each other. A shifting mechanism including a shift lever enables shifting of the movable carrier to a plurality of shifting positions corresponding with the drive sprockets. A cam is fixedly mounted on the first part of the guide system and a cam follower member including a cam follower is rotatably mounted on the second part of said guide system. The cam member and the cam follower member are moved relative to each other by operation of the shift lever and an additional guide element is provided for maintaining the cam follower in contact with the cam member during relative movement therebetween thereby to effect movement of the movable carrier member during this relative movement.

33 Claims, 11 Drawing Figures

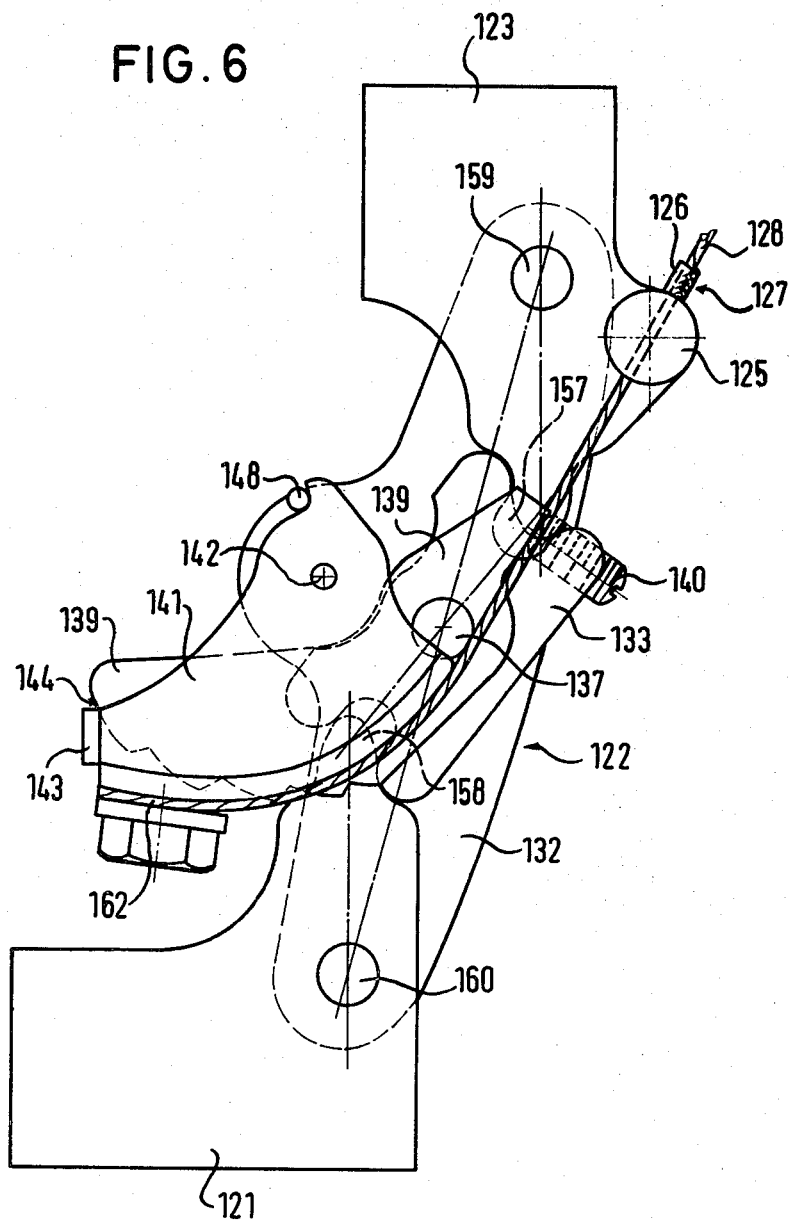

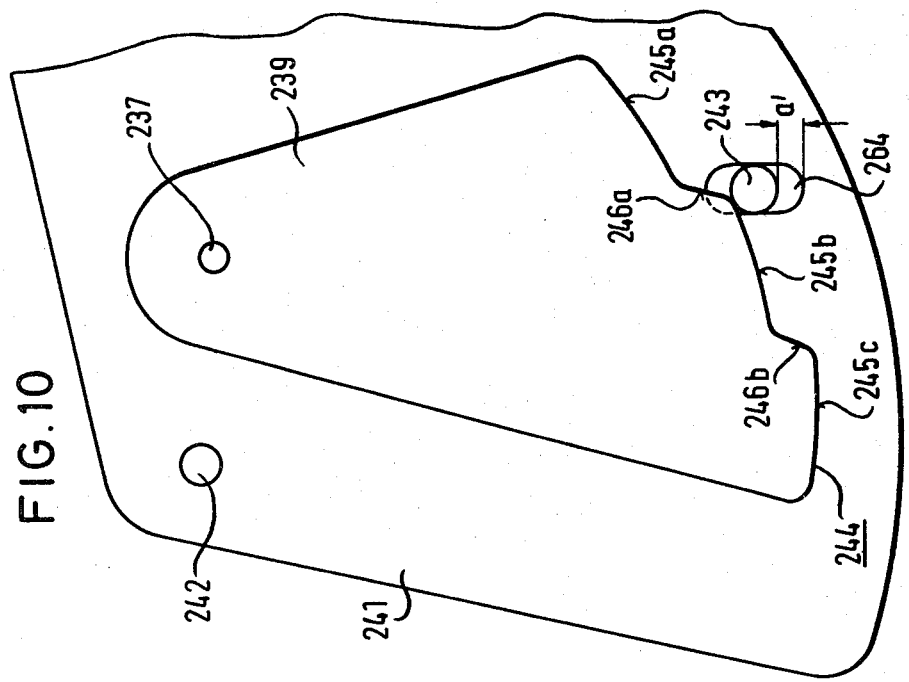
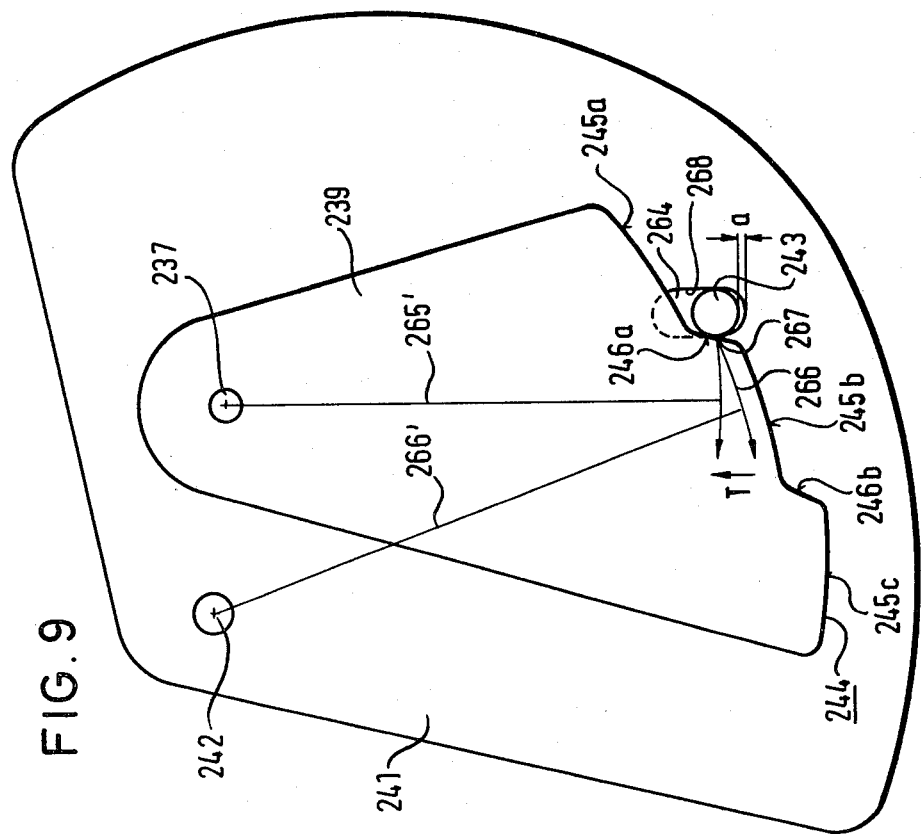

DERAILLER SYSTEM FOR A BICYCLE

The present invention relates generally to derailler systems for bicycles or similar vehicles and more particularly to a system of the type consisting of a set of sprockets having a varying number of teeth arranged in side-by-side relationship in the direction of the axis of the bicycle wheel which is to be driven by the system, with an idler sprocket being provided to enable shifting of a drive chain of the bicycle wheel driving system.

In devices of the type to which the present invention relates, the idler sprocket is mounted upon a movable carrier and it is rotatable about an axis which is essentially parallel to the axis of the bicycle wheel to be driven. The movable carrier member is guided along a path of motion which is essentially parallel with the axis of the bicycle wheel by means of a guide system which is operatively attached with the frame of the bicycle. A shift mechanism includes a shift lever which is operable through transmission means to effect shifting of the movable carrier into various positions in accordance with the individual sprockets of the sprocket system. A cam plate is arranged on the first of two parts of the guide system which are movable relative to one another and a cam follower is arranged on the second of these two parts of the guide system. The shift lever acts through the transmission means to effect relative movement between the cam plate and the cam follower and the device includes further elements provided in order to maintain the cam follower in constant contact with the cam plate and thus to cause the movable arm to move during relative movement between the cam plate and the cam follower.

A derailler system of the type to which the present invention relates is disclosed in U.S. Patent Application Ser. No. 61,065, filed July 26, 1979, now U.S. Pat. No. 4,273,546.

The present invention is directed toward providing a derailler system of the type described wherein the operation of the system will be trouble free over an extended period of time with the system being simple to operate and to adjust and requiring a minimum of maintenance.

An advantage of the invention derives from the fact that the drailler system which is provided requires a minimal shifting path of the shift lever thereby advantageously influencing the design of the shift lever. Furthermore, favorable interaction between the cam plate and the cam follower may be achieved thus making it possible to considerably reduce the effort necessary for shifting of the derailler system.

SUMMARY OF THE INVENTION

Briefly, the present invention may be described as a derailler system for a bicycle including a sprocket system having a plurality of drive sprockets and a chain for driving the wheel of the bicycle at different speeds comprising a movable carrier member having an idler sprocket rotatably mounted thereon for selectively shifting the chain into engagement individually with the sprockets, a guide system for guiding movement of the carrier member along a path essentially parallel with the axis of the driven wheel to urge the chain between individual sprockets, a shifting mechanism including a shift lever for enabling shifting of the movable carrier to a plurality of shifting positions corresponding with the drive sprockets, a cam member fixedly mounted on a first or two parts of said guide system which are movable relative to one another, a cam follower member rotatably mounted on the second of said two relatively movable parts, transmission means for enabling said cam member and said cam follower member to be moved relative to each other by operation of said shift lever, and additional guide means for maintaining the cam follower in contact with the cam member during relative movement therebetween thereby to effect movement of the movable carrier member during said relative movement, the transmission means being connected to effect rotation of the cam follower member relative to said first part by operation of the shift lever thereby to effect movement of the first part of the guide system by engagement of the cam follower with the cam member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings

FIGS. 6 and 7 are views taken in a direction similar to the direction of the arrow II as shown in FIG. 1 depicting in greater detail a guide system structured in accordance with the principles depicted in FIG. 5;

FIGS. 9, 10 and 11 are schematic views showing a modification of a guidance system of the type depicted in FIGS. 2–4 and shown, respectively, in various operational positions.

DESCRIPTION OF THE PREFERRED EMBODIMENTS

Figure 1:
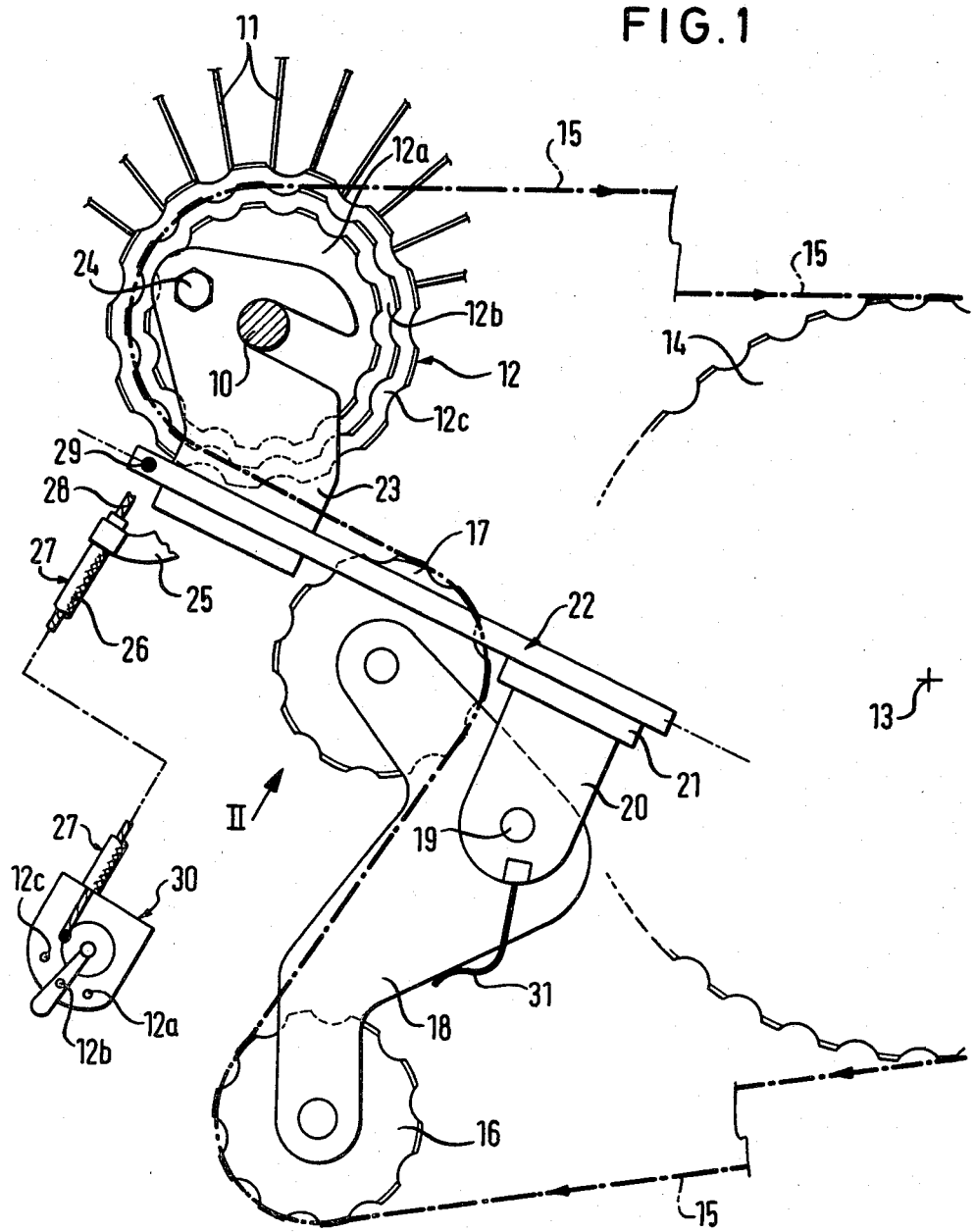
FIG. 1 is a schematic side view showing a derailler system in accordance with the invention.

Referring now to the drawings, wherein similar parts are identified with like reference characters throughout the various figures thereof, there is shown in FIG. 1 a derailler system in accordance with the invention which is operatively associated with the rear axle 10 of a bicycle wheel 11 represented by the spokes of the wheel. The rear wheel 11 is connected to a sprocket system 12 including a plurality of sprockets 12a–12c arranged concentrically with regard to the rear wheel and connected therewith to enable driving of the wheel at various speeds.

The system includes a conventional drive mechanism including a bicycle pedal bearing 13 upon which a drive sprocket 14 is rotatably mounted on one side of the pedal bearing.

A chain 15 extends from the sprocket 14 toward the sprockets of the sprocket system 12. The chain 15 extends over a tension pinion 16 and over an idler sprocket or wheel 17. The tension pinion 16 and the idler sprocket 17 are rotatably mounted upon a twinarm tension lever 18 which is arranged under the influence of a tension spring 31. The tension lever 18 is mounted upon a lug 20 and rotatably connected thereto by a swiveling axle 19.

The system of the invention includes a movable carrier member 21 which supports the lug 20 and which is mounted upon a guide system 22 arranged to lie in a plane extending perpendicular to the plane of the drawing of FIG. 1 and movably guided in the plane perpendicular to FIG. 1. The guide system 22 is supported by a frame-mounted support member or carrier 23 which is fastened to the rear axle 10 and which is additionally attached to the bicycle frame by means of a screw 24.

An arm 25 which is fastened to the frame-mounted carrier 23 supports and is abutted by a sheath 26 of a Bowden wire 27 which acts upon the guide system 22 at a point 29. The Bowden wire 27 emanates from a shift lever 30 and by means of the wire 27 the guide system 22 may be actuated from the shift lever 30 in such a manner that the movable carrier 21 will be shifted in a direction which is essentially perpendicular to the plane of the drawing in FIG. 1. As a result, the idler sprocket 17 will be shifted in a direction along the rear axle 10 by the movable carrier 21.

Shifting of the idler sprocket 17 along the rear axle 10 will cause transfer of the chain 15 between the individual sprockets 12a–12c of the sprocket system 12. The chain 15 will always shift onto the sprocket which at any time is located essentially in a plane common with the plane of the idler sprocket 17 and extending parallel with the plane of the drawing in FIG. 1.

Figure 2:
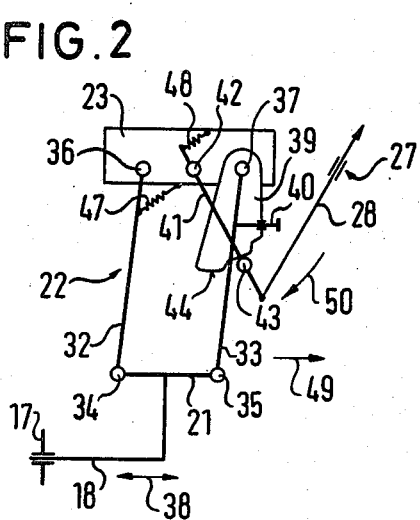
FIG. 2 is a schematic view of the derailler system of FIG. 1 as viewed in the direction of the arrow II of FIG. 1.

The guide system of the invention is schematically shown in FIG. 2 as comprising a guide-rod system which is formed with a generally rectangular orientation whereby the rectangular system is comprised of the frame-mounted carrier or arm 23 consisting of a first guide member of the system, the movable arm 21 consisting of a second guide arm or member of the system and furthermore of a third guide member 32 and a fourth guide member 33. The guide members 21, 23, 32 and 33 are connected by articulated joints 34–37. Whenever the rectangular guide system 22 is deformed within the plane of the drawing of FIG. 2, the idler wheel 17 will move in the direction of the twin-arrow 38 which, as viewed in FIG. 1, is a direction parallel with the axial direction of the rear wheel axle 10.

A cam member 39 is rotatably mounted at a pivot point 37 with the cam member 39 being connected with the guide member 33 by means of a screw 40, the connection being such that during operation the cam member 39 is rigidly and positively connected with the guide member 33 such that however for purposes of shifting of the system the position of the cam member 39 relative to that of the guide member 33 can be changed or altered.

A cam follower member or carrier 41 including a cam follower 43 is pivotally mounted at the frame-mounted guide member 23 by a carrier or sliding joint 42. The cam follower 43 engages with a cam surface 44 of the cam member 39. The shape of the cam surface 44 may be seen more clearly in FIG. 4 and as depicted therein it is formed of three plateaus 45a, 45b and 45c and of intermediate transitional flanks 46a and 46b.

A traction or pull cable 28 operates to exert a force upon the cam follower member 41.

A first helical spring 47 is connected between the guide members 23 and 32 and the spring 47 applies a spring biasing force tending to drive the rectangular guiding system 22 in the direction of the arrow 49.

A second helical tension spring 48 which is essentially stronger than the spring 47 acts upon the cam follower member 41 by applying a spring bias thereto tending to shift the cam follower member 41 in the direction of the rotary arrow 50.

As a result of the action of the spring 47, the plateau 45b of the cam surface 44 will be maintained in positive engagement with the cam follower 43 as depicted in FIG. 2. When the traction wire 28 is released by operation of the shift lever 30, the spring 48 will apply a strong spring force tending to turn the cam follower member in a clockwise direction indicated by the rotary arrow 50 depicted in FIG. 2. As a consequence of this action, the cam follower 43 will become engaged with the plateau 45c of the cam surface 44 whereby the cam member 39 will be swiveled clockwise and whereby the entire rectangular guide system 22 will be moved in a direction opposite to the direction of the arrow 49 shown in FIG. 2.

When the cam follower 43 rests upon the plateau 45c, the rectangular guide system 22 will assume a position as far to the left as possible as viewed in FIG. 2. In this position, the idler sprocket 17 will lie approximately in a plane coinciding with the plane of the largest sprocket 12c of the sprocket system 12 and the chain 15 will run off onto this largest sprocket 12c.

If the cam follower 43 is in engagement with the plateau or notch 45b, then the idler sprocket 17 will be situated in a plane coinciding with the plane of the center sprocket 12b and the chain 15 will run off onto the center sprocket 12b.

If the cam follower member 41 is swiveled against the action of the stronger spring 48 by operation of the traction wire 28 in a direction opposite to the direction of the arrow 50, then the cam follower 43 will assume a position in contact with the plateau 45a. Accordingly, the rectangular guide system 22 will be shifted by the weaker spring 47 in the direction of the arrow 49 as seen in FIG. 2 and the shifting movement will be to the right until the cam follower 43 abuts the plateau 45a. The rectangular guide system 22 will then assume a position furthest to the right as seen in FIG. 2 and in this position the idler sprocket 17 will be situated approximately in a plane coinciding with the plane of the smallest sprocket 12a and as a result the chain 15 will run off onto this smallest sprocket 12a.

Figure 4:
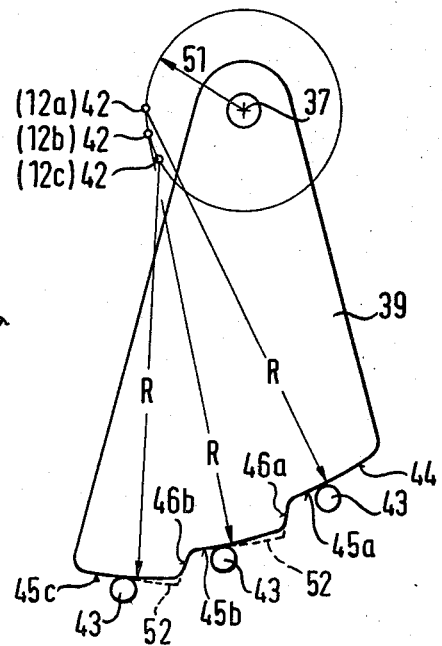

As previously pointed out with reference to both FIGS. 2 and 4, the cam follower 43 engages the plateau 45b and when in this position the plateau 45b will be located in such a manner that it will follow the arc of a circle around the pivot point 42. As a result, if the cam follower member 41 is shifted to a slight degree about the pivot 42, the orientation of the rectangular guide system 22 will not be changed. This provides a significant advantage in that at a specific adjustment or positioning of the lever 30 a slight change in the length of the wire 28 will exert no influence on the configuration of the rectangular guide system 22 and thus the idler sprocket will remain unmoved. This advantageous mode of operation is desirable even if the cam follower rests on any of the other plateaus 45a or 45c. For this reason, the corresponding plateau 45a, 45b or 45c engaged by the cam follower 43 must, in each shifting position of the system according to FIG. 2, be formed in the configuration of an arc of a circle extending about the pivot 42. This is schematically depicted in FIG. 4.

Thus, it may be assumed that the cam member 39 will be held firmly in position and that, once the rectangular guide system 22 is shifted, the pivot 42 will move accordingly on the arc of a circle 51 around the pivot 37 whereby the radius of the arc 51 will correspond with the distance between the pivot 37 and the carrier pivot 42. By referring to FIG. 4 wherein the various radii R are shown, it will be seen that in each position of the rectangular guide system 22, and thus at each point of contact of the cam follower 43 with each of the plateaus 45a, 45b and 45c, the plateau in question will follow the arc of a circle around the carrier pivot 42.

In FIG. 4 raised portions 52 which may be provided at the plateaus 45b and 45c in the transitional area of the pertaining flanks 46a and 46b respectively and which deviate from the circular path around the carrier pivot 42 are indicated in broken line form. These raised portions have been provided in order that whenever the cam follower 43 moves from plateau 45b to plateau 45c, it must first negociate the raised portion 52. As a result, during passage of the cam follower 43 over the raised portion 52, as seen in FIG. 2, the rectangular guide system 22 will be deflected toward the left to a greater degree than would normally be caused by the plateau 45c alone. As a result, the idler sprocket 17 is also shifted beyond its position corresponding to the plateau 45c, that is beyond the plane corresponding to the largest sprocket 12c. This facilitates transfer of the chain 15 from the center medium-sized sprocket onto the larger sprocket 12c.

The transfer of the chain 15 between the individual sprockets 12a–12c may normally be affected only with the chain in running condition. However, the device according to the invention is designed in such a way that the shift lever 30 may also be moved to positions corresponding to the various sprockets 12a–12c with the chain stationary. If the shift lever 30 is moved out of the position shown in FIG. 1 and corresponding with the sprocket 12b and into the position of sprocket 12a, the rectangular guide system 22, as seen in FIG. 2, will be temporarily blocked in the position shown in FIG. 2 as a result of the idler sprocket 17 being engaged with the chain 15. If the cam follower 43 is then moved out of the position shown in FIG. 2 into juxtaposition with the plateau 45a (FIG. 4) the plateau 45a will be temporarily prevented from abutting against the cam follower 43 because of the blocking of the rectangular guide system 22. However, if the chain 15 is set in motion, the chain will shift from the center sprocket 12b to the smaller sprocket 12a and the blocking of the rectangular guide system 22 will be terminated. As a result, the system 22 as shown in FIG. 2 will move under the influence of the helical spring 47 in the direction of the arrow 49 toward the right and the plateau 45a will now be capable of moving against the juxtaposed cam follower 43.

Conversely, if the shift lever 30 is moved into the position corresponding to sprocket 12c while the chain is stationary, then the cable 28 will be loosened. However, the helical spring 48 will be unable to move the cam follower carrier into the position where the follower 43 may engage the plateau 45c due to the fact that the rectangular guide member 22 will again be blocked by the idler sprocket 17 which is in engagement with the chain 15. The guide member 22 will be shifted toward the left by the stronger helical spring 48, as shown in FIG. 2, and contrary to the direction of the arrow 49 by the action of the cam follower 43 moving onto the plateau 45c when the chain begins running again and as a result the chain will shift from the center sprocket 12b onto the larger sprocket 12c.

Figure 3:
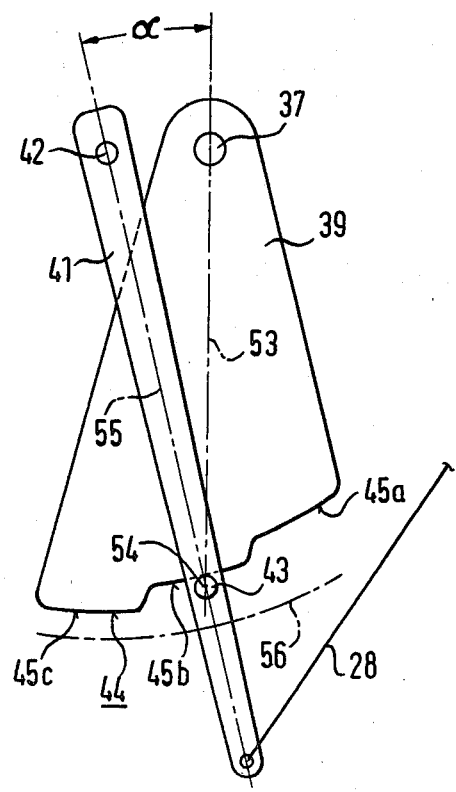
FIGS. 3 and 4 are schematic views for depicting various positions of parts of the guide system as shown in FIG. 2.

As will be seen from FIG. 3, with the cam follower 43 juxtaposed relative to the plateau 45b, the angle between a connecting line 53—extending between the contact point of the cam follower 43 with the plateau 45b and the pivot point 37—and the connecting line 55—extending between the contact point 54 and the pivot 42—will enclose between them an acute angle $\alpha$. Whenever the cam follower 43 is in contact with the plateaus 45a and 45c, the angle $\alpha$ will change but it will however not become significantly larger and, independently of the geometry of the arrangement shown, it will not exceed 90° to any significant extent.

Shown in FIG. 3 is the envelope of the curve defining the cam surface 44 which is indicated in a chain-dotted line 56. The envelope 56, together with the connecting line 55 extending between the contact point 54 and the pivot 42, form between them an angle of approximately 90° and this angle of 90° will be essentially maintained even during contact between the cam follower 43 and the plateaus 45a and 45c.

As far as the raised portions 52 on the plateaus 45b and 45c are concerned, it should be noted at this stage that these raised portions may be formed as tangents to the plateaus 45b and 45c. That is, they may be tangent to the curves having the radii R whereby these tangents will have contact approximately at the center of each of the plateaus 45b and 45c.

Figure 5:
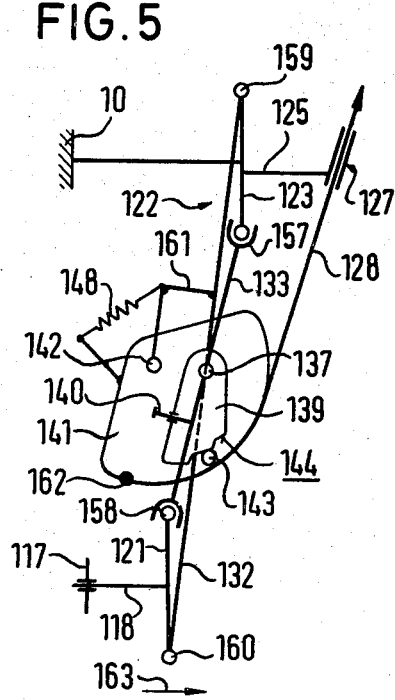
FIG. 5 is a schematic view showing a modification of the guide system as viewed in a direction similar to the direction of the arrow II in FIG. 1.

A further embodiment of the invention is shown in FIG. 5 wherein identical parts have been provided with identical reference characters as in FIG. 2 but in each case the reference character is increased by a factor of 100.

The guide system shown in FIG. 5 is composed of a frame-mounted carrier 123, a movable carrier or arm 121, a short connecting member 133 and a long connecting member 132. The two connecting members 133 and 132 are joined to each other by means of a universal joint 137 and the shorter guide member 133 is connected to the frame mounted carrier 123 by means of a sliding joint 157 and to the movable carrier or arm 121 by means of a sliding joint 158. The longer guide member 132 is joined to the frame-mounted carrier 123 by a joint 159 and to the movable arm 121 by a joint 160. The cam follower carrier, which in the case of this embodiment is designed as a pulley 141 carrying the cam follower 143, is mounted in a bracket 161 by means of a joint 142 whereby the bracket is rigidly connected with the longer connecting member 132. The cam plate 139 is rotatably mounted in the universal joint and connected to the short guide member 133 by means of a screw 140 in such a way that the cam plate 139, while in operation, will be rigidly connected with the short guide member 133. However, for the purposes of preselection, relative motion of the cam plate 139 toward the short guide member 133 may be possible. The cable 128 is firmly attached at a point 162 and extends over the circumference of the pulley 141.

FIG. 5 depicts the system at a position during which the cam follower 143 is in contact with the center plateau corresponding with the plateau 45b shown in FIG.

4 so that the chain 15 will run off onto the center sprocket 12b.

If the cable 128 is pulled in the direction of the arrow indicated in FIG. 5, the pulley 141 will be rotated counterclockwise around the carrier pivot 142 and the helical spring 148 will be more strongly stressed. Thus, the cam follower 143 will be moved into juxtaposition with the next lower plateau corresponding with the plateau 45a as seen in FIG. 4. However, since the cable 128 which is maintained under constant tension by the helical spring 148 has a tendency of rotating the entire guide system 122 in the direction of the arrow 163, the system 122 will yield in the direction of the arrow 163. The shorter guide member 133 with the cam plate 139 will be rotated counterclockwise and the plateau corresponding to plateau 45a of FIG. 4 will again abut against the cam follower 143. At this point, the idler sprocket 117 will be approximately within the plane of the smallest sprocket 12a. If the cable 128 at the shift lever 30 is released and moves in the direction of shifting toward the largest sprocket 12c, the pulley 141 will be rotated clockwise by means of the spring 148 and the cam follower 143 will reach the plateau corresponding to the plateau 45c shown in FIG. 4. As a result, the cam plate 139 will be rotated clockwise around the universal joint 137 and it will take along with it the shorter guide member 133 which is rigidly affixed thereto. As a result of this clockwise movement, the idler sprocket 117 will be moved against the direction of the arrow 163 shown in FIG. 5 toward the left and it will thus enter the plane of the larger sprocket 12c.

At this point it should be noted that in the embodiment according to FIG. 5 only one helical tension spring is provided which is sufficient for the system. A special spring corresponding to the spring 47 as shown in FIG. 2 which maintains the cam follower in engagement with the cam plate is not necessary and in this particular case the spring 148 may additionally assume this function. As a result of the tension exerted by the spring 148 on the cable 138 there is, as previously mentioned, a constant pretensioning applied to the guide system 122 in the direction of the arrow 163 thereby causing the cam follower to tend to maintain constant abutment against the cam surface 144. This requires that the helical spring 148 be under constant tension even though this tension may be relaxed to a significant degree, i.e. whenever the cam follower 143 abuts against the plateau corresponding to 45c.

Furthermore, it will be necessary to bring the cable 128 near the guide system 122 by a corresponding dimensioning of the arm 125 in such a manner that the cable 128 will exert a constant pretension on the guide system 122 in the direction of the arrow 163. The aforementioned arrangement is insured in FIG. 5 by the fact that the cable 128, at the point where it engages the circumference of the pulley 141, will have a component directed toward the right.

Figure 7:
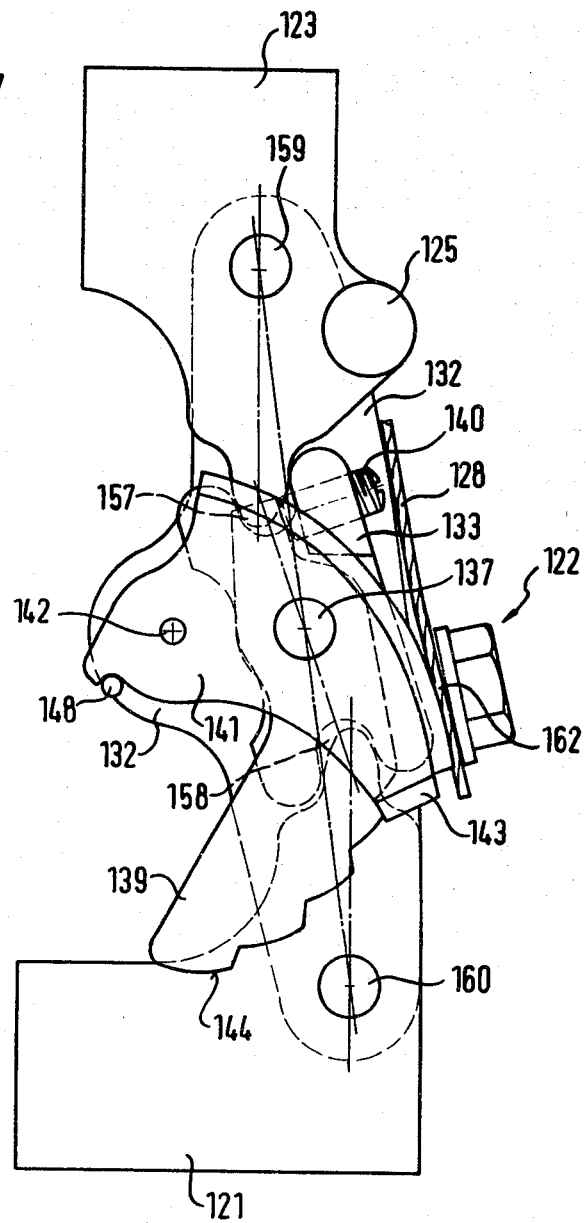
Figure 8:
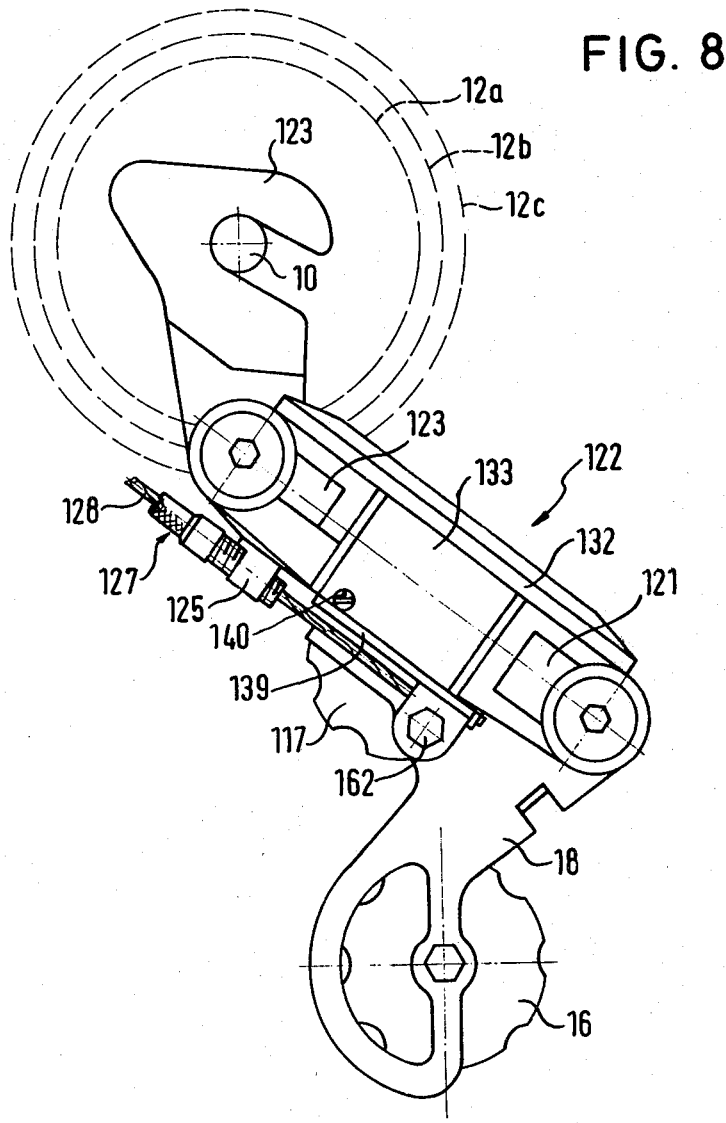
FIG. 8 is a view taken in a direction corresponding to the view of FIG. 1 depicting the guide system in accordance with FIGS. 6 and 7.

The differences between the embodiment of FIG. 5 and those shown in FIGS. 6–8 primarily reside in the fact that the cam surface 144 of the cam member 139 is formed with five plateaus and that the cam follower 143 has been designed as a rectangular slider. As a further difference from the embodiment in FIG. 5, the spring 148 is designed as a torsion spring extending around the pivot joint 142. A further difference resides in the fact that there are sliding joints 157 and 158 of one cycloid tooth each and one tooth space or gap accommodating this tooth. As a further difference to the embodiment of FIG. 5, the set screw 140 is arranged in such a way that it will abut against the shorter guide member 133 under constant pressure without requiring that it be connected with the guide member 133 in any additional way.

FIG. 6 shows the system in the position at which the chain 15 is running over the largest of the sprockets which in this embodiment will number five. FIG. 7 shows the system in the position at which the chain 15 runs over or transfers onto the smallest of the sprockets. As far as the operational behaviour of the system is concerned, the embodiment according to FIGS. 6–8 basicallly corresponds with that of the embodiment shown in FIG. 5.

Additionally, it should be noted that in both embodiments the angle α, similar to that shown in the view of FIG. 3, will always be an acute angle and will never exceed 90° to any significant extent.

Figure 11:
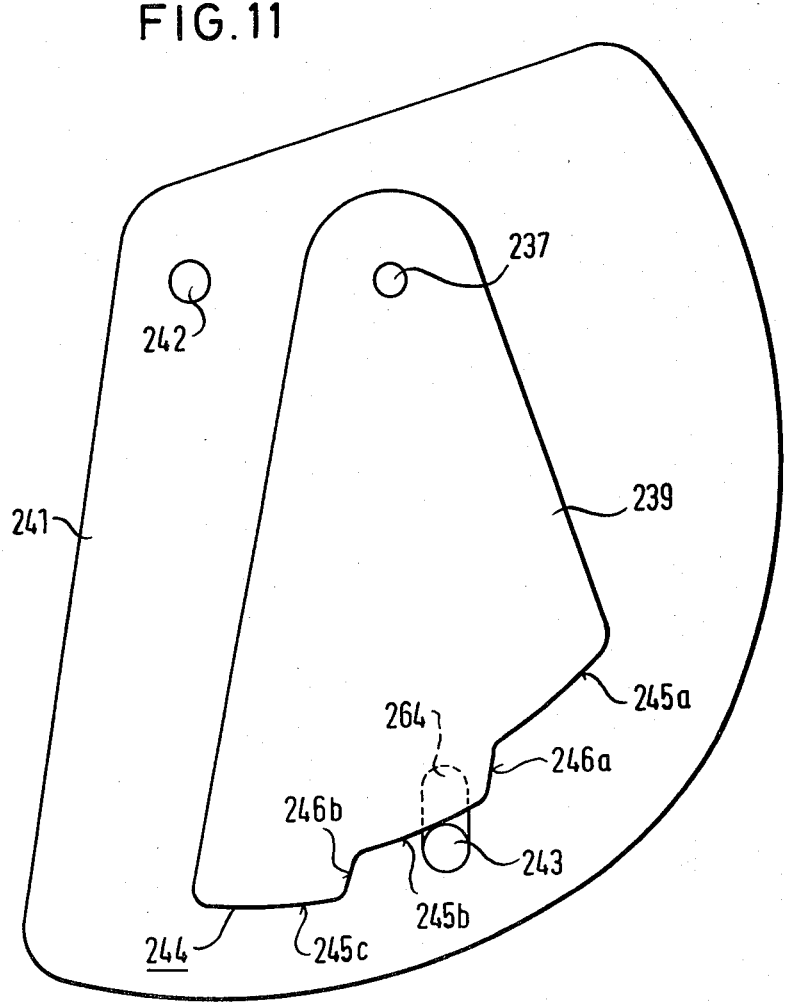

A modification of the embodiment depicted in FIGS. 2–4 is shown in FIGS. 9–11 wherein the raised portions shown in FIG. 4 and identified with the reference numeral 52 which define the transfer path of the cam follower are replaced with an alternative feature.

In FIGS. 9–11, analagous parts are identified with numerals similar to those in FIGS. 2–4 except that they are augmented by a factor of 200.

The embodiments according to FIGS. 9–11 deviate from the embodiment of FIGS. 2–4 in that the raised portions on the plateaus are eliminated. Instead, the plateaus 245a–245c will follow exactly the curvatures indicated in FIG. 4 by the radii R over the entire length of the plateau in question. In a further deviation from the arrangement of FIGS. 2–4, the embodiments according to FIGS. 9–11 are arranged so that the cam follower 243 is formed as a cylindrical roller which is accommodated in a slot 264 of the cam follower carrier 241 which is designed as a pulley similar to the arrangement depicted in FIG. 5.

The slot 264 is arranged within the pulley 241 in such a way that it extends in a longitudinal direction approximately parallel, or at a slight acute angle, to the transitory flanks 246a and 246b.

The sequential embodiments of FIGS. 9 and 10 show the transition of the cam follower 243 from the plateau 245a onto the plateau 245d. In order to depict this transitory state, FIG. 9 indicates the rotary motion of the cam plate 239 as being around the pivot 237 by means of a rotary arrow 265 while the rotary motion of the pulley 241 around the carrier pivot 242 is indicated by a rotary arrow 266. The resultant of these rotary arrows 265 and 266 is identified by the symbol T in FIG. 9. Thus, the resultant T represents upward motion in FIG. 9 of the point of contact of the flank 246a with the cam follower 243 in relation to the pulley 241. This means that the cam follower designed as a cylindrical roller, under the force of being clamped between the point of contact 267 and the edge 268, is rolled upwardly at the edge 268 into the positions shown in FIGS. 9 and 10 as indicated by the increasing distances a and a' from the lower end of the slot 264.

Only after the cam follower 243 reaches the plateau 264b as shown in FIG. 11, wherein the clamping between the flank 246a and the edge 268 of the cam follower 243 has terminated, will the cam follower 243 again snap back into the lower end of the slot 264 under the effect of a pretensioning force exerted by a helical tension spring similar to the spring 47 shown in FIG. 2, which force is exerted onto the guide system 22 and thus onto the cam plate 39.

If, as shown in FIG. 10, the cam follower 243 is lifted from the lower end of the slot 264 by a distance a' shortly before reaching the plateau 245b, this will indicate that the cam plate 239 and the pulley 241 have shifted positions more considerably with relation to each other that would correspond with a difference between the plateaus 245a and 245b, i.e. that in the system depicted in FIG. 2, the guide system 22 in the state according to FIG. 10 has been moved further left in the direction of the opposing arrow 49 than is indicated by the plateau 245b. This means that the idler sprocket 17, when transferring from a plane corresponding to the sprocket 12a in a direction toward the plane corresponding to the sprocket 12b, will be temporarily moved beyond the latter plane thereby facilitating transfer of the chain 15 from the sprocket 12a onto the larger sprocket 12b. This is of special interest inasmuch as it is well know that transfer from a smaller to a larger sprocket may present special difficulties.

A similar effect will of course occur if the cam follower 243 reaches the plateau 245c from the plateau 245b via the flank 246b.

For a better understanding of the embodiments of FIGS. 9-11, it should be noted that the relative positions of the cam plate and of the pulley 241 are shown only schematically and do not represent the correct relationships of relative motion. The lines 265' and 266' are intended solely to indicate that arrows 265 and 266 are coordinated with pivots 237 and 242.

It should be stated that the curve or cam surface 44 is, in all embodiments, open on one side. This is important in that in such a case the cam follower is capable of being lifted off the cam surface especially in such cases where the preselection of a certain speed is to be effected over several shifting steps. In this respect, the unilaterally open curve, as shown in the embodiment, is more advantageous than a theoretically similarly feasible closed curve.

When the derailler system is first adjusted, the cam follower 43 must be positioned in relation to a plateau used for the adjustment in such a manner that, with a possible elongation of the cable 28, the motion of the cam follower 43 along the plateau in question will be properly effected so that the guide system will not alter its position.

The embodiment depicted in FIGS. 9-11 is more advantageous than the embodiment according to FIG. 4 in that the transfer path is achieved without the necessity for changing the curvature of the plateaus so that in the event that the cable is lengthened longer plateaus are available.

As will be seen from FIG. 2, the cam plate 39 and the cam follower arm or carrier 41 have been mounted on one and the same component; namely the rigid carrier 23. This greatly facilitates the manufacturing precedures of the derailler system and it will help circumvent essential tolerance problems. The two bearing points on the rigid arm 23, i.e. the bearing 42 for the cam follower carrier 41 and the bearing for the cam plate 39 may be for example manufactured in one operation so that a preselected distance between these two pivot points will be maintained at a precise dimension at all times.

In the embodiment according to FIG. 2, the cam plate 39 and the cam follower carrier 41 are both mounted on the rigid member 23. The pivotal point of the cam plate 39 thereby coincides with the pivotal point of the connecting member 33. This is additionally advantageous from the point of view of manufacturing expenses while also providing the ability to eliminate impression in the dimensioning.

In the embodiment according to FIG. 5, the joint or link between the two guide members 132 and 133 is also the pivotal point for the cam plate 139. Furthermore, the fulcrum 142 of the cam follower carrier 141 is mounted on the longer connecting guide member 132 so that the fulcrums 142 and 137 on the long member 132 can also be manufactured in one operation. This results in an embodiment offering advantages with regard to simplicity of manufacture and dimensional accuracy.

By means of the set screw 40 shown in FIG. 2, or the set screw 140 shown in FIG. 5, basic adjustment of the guide system may be achieved in a single operation.

In the two embodiments according to FIGS. 2-4 and according to FIG. 5, the rotary motion of the cam plate 39, 139 will have the same sense of direction as the rotary motion of the cam follower carrier 41, 141 which initiates such rotary motion. This is of special advantage with regard to the achievement of a favorable motive cycle between the cam follower 43, 143 and the cam surface 44, 144.

While specific embodiments of the invention have been shown and described in detail to illustrate the application of the inventive principles, it will be understood that the invention may be embodied otherwise without departing from such principles.

What is claimed is:

1. A derailler system for a bicycle including a sprocket system (12) having a plurality of drive sprockets (12a-12c) and a chain (15) for a driving a wheel of said bicycle at different speeds comprising: a guide system (22) including a plurality of guide members (23, 32, 33, 21), one (21) of said guide members being a movable carrier member having a chain mover element (17) mounted thereon for selectively shifting said chain (15) into engagement individually with said drive sprockets (12a-12c), said chain mover element (17) being movable along a path (38) essentially parallel with the axis of said sprockets (12a-12c) to urge said chain between individual sprockets, said guide members (23, 32, 33, 21) including a first (33) and a second guide member (23) movable relative to each other; a shifting mechanism (30) including a shift element for enabling shifting of said chain mover element (17) to a plurality of shifting positions corresponding with said drive sprockets (12a-12c); a cam member (39) fixedly mounted on said first guide member (33) of said guide system (22); a cam follower member (41) consisting essentially of an element different from any of said plurality of guide members (23, 32, 33, 21) and including a cam follower (43) rotatably mounted on said second guide member (23) of said guide system (22); transmission means (27) for enabling said cam member (39) and said cam follower member (41) to be moved relative to each other by operation of said shift element; and additional guide means (48) for maintaining said cam follower member (41) in contact with said cam member (39) during relative movement therebetween thereby to effect movement of said chain mover element (17) during said relative movement; said transmission means (27) being connected to effect rotation of said cam follower member (41) relative to said second guide member (23) by operation of said shift element thereby to effect movement of said first guide member (33) of said guide system (22) by engagement of said cam follower member (41) with said cam member (39).

2. A system according to claim 1 wherein said additional guide means (48) comprise spring means (48) acting upon said cam follower member (41).

3. A system according to claim 1 wherein said cam follower member (41) is movable between a primary and a secondary terminal angular position relative to said second guide member (23) and wherein said additional guide means (48) comprise spring means (48) applying a biasing force urging said cam follower member (41) in a direction (50) toward said primary angular position, said shifting mechanism (30) operating through said transmission means (27) to enable said cam follower member (41) to be moved toward said secondary angular position.

4. A system according to claim 1, 2, or 3 wherein said cam member (39) is formed with a cam surface (44) defining a number of engaging plateaus (45a, 45b) with a transitional flank (46a, 46b) being provided between each of said plateaus (45a, 45b).

5. A system according to claim 1 wherein said second guide member (23) of said guide system (22) comprises a frame-mounted carrier (23) affixed to said bicycle, wherein said first guide member (33) of said guide system (22) comprises an arm pivotally mounted relative to said second guide member (23) and wherein said guide system (22) includes a third guide member (32) extending generally parallel to said first guide member (33) and also pivotally mounted relative to said second guide member (23), said movable carrier member (21) comprising a fourth guide member (21) of said guide system (22) pivotally interconnected with both said first (33) and said third (32) guide members.

6. A system according to claim 5 wherein said first (33) and said second (23) guide members of said guide system (22) are connected by means of a connecting joint (37) and wherein said cam follower member (41) is rotatably mounted on said second guide member (23) about a fulcrum (42) positioned externally of said connecting joint (37).

7. A system according to claim 6 wherein the angle enclosed by a first line (53), extending between the point at which said first guide member (33) is pivoted to said second guide member (23) and the point of contact between said cam follower (43) and said cam member (39), and a second line (55), extending between the point at which said cam follower member (41) is pivoted to said second guide member (23) and the point contact between said cam follower (43) and said cam member (39), is an angle (α) which in all engaging positions of said cam follower (43) on said cam member (39) is less than 120°.

8. A system according to claim 7 wherein said angle (α) is less than 90°.

9. A system according to claim 8 wherein said angle (α) is less than 60°.

10. A system according to claim 6, 7, 8, or 9 wherein a line (55) extending between the point (42) at which said cam follower member (41) is pivotally mounted on said second guide member (23) and the point of contact between said cam follower (43) and the cam surface (44) of said cam member (39) is in all positions of said cam follower (43) approximately 90° relative to an envelope (56) of the curves of said cam surface (44).

11. A system according to claim 10, wherein deviation of said right angle is less than 35°.

12. A system according to claim 4 wherein the configuration of said plateaus is such that during at least a part of the movement of said cam follower along a given plateau (45a, 45b) of said cam surface (44) the position of said movable carrier member (21) will remain essentially unchanged.

13. A system according to claim 4 wherein at least parts of said plateaus (45a, 45b, 45c) are formed as arcs of circles having an identical radius of curvature, the central points (42) of which are situated on a circular locus extending about the point (37) at which said first guide member (33) is pivotally connected with said second guide member (23), the radius of said circular locus corresponding with the distance between the pivot point (37) of said first guide member (33) relative to said second guide member (23) as a common center and the pivot point (42) of said cam follower member (41) relative to said second guide member (23).

14. A system according to claim 4 wherein the position of said cam follower (43) relative to said cam member (39) changes as said cam follower (43) moves from one of said plateaus (45a) to another of said plateaus (45b) and wherein said system includes means for temporarily altering the relative positioning of said cam member (39) and said cam follower (43) to a greater degree than the relative movement effected by passage of said cam follower (43) from one plateau (45a) to another plateau (45b).

15. A system according to claim 14 wherein a raised portion (52) is provided on said cam surface (44) at an end of each of said plateaus (45a, 45b, 45c) adjacent said transitional flank (46a, 46b).

16. A system according to claim 14 wherein said cam follower (43) and said cam follower member (41) are capable of at least some limited motion on one side in a direction which is approximately parallel to the direction of said transitory flanks.

17. A system according to claim 16 wherein said cam follower (243) is held in a slot (264) of said cam follower member (241).

18. A system according to claim 16 wherein said cam follower (243) comprises a cylindrical roller (243) rotatable relative to said cam follower member (241).

19. A system according to claim 17 wherein said cam follower (243) comprises a cylindrical roller (243) rotatable relative to said cam follower member (241).

20. A system according to claim 1 wherein said guide system is formed as a parallelogram-type guide member system, said system including four guide members (23, 32, 33, 21) which are comprised of said second guide member (23) formed as a frame-mounted carrier member affixed with said bicycle, said first guide member (33) pivotally connected with said second guide member (23) and having said cam member (39) affixed thereto, a third guide member (32) pivotally connected at opposite ends thereof between said second guide member (23) and said movable carrier member (21) and said movable carrier member (21) as a fourth guide member (21) of said guide system (22), said movable carrier member (21) being pivotally interconnected between said first guide member (33) and said third guide member (32).

21. A system according to claim 1 wherein said guide system is formed as a four-member guide system including said second guide member (123) as a frame-mounted carrier member affixed with said bicycle, said movable carrier member (121) connected as a fourth guide member (121) of said guide system (122), said first guide member (133) pivotally mounted on said second guide member (123), and a third guide member (132) of said guide system, said first (133) and said third guide members of said guide system (122) being of differing lengths and connected to intersect each other with the first (133) and third guide members are their intersecting point (137) being joined by a first joint (137) and wherein said first (133) and said third guide members in addition are connected with said frame-mounted carrier member (123) by means of a second (157) and third (159) fulcrum, said first (133) and said third (132) guide members being connected with said movable carrier member (121) by a fourth (158) and a fifth (160) fulcrum, respectively, said five fulcrums 137, 157, 158, 159, 160 being designed with two (157, 158) of said fulcrums as sliding joints.

22. A derailler system for a bicycle including a sprocket system having a plurality of drive sprockets and a chain for driving a wheel of said bicycle at different speeds comprising: a movable carrier member having an idler sprocket rotatably mounted thereon for selectively shifting said chain into engagement individually with said drive sprockets; a guide system for guiding movement of said carrier member along a path essentially parallel with the axis of said sprockets to urge said chain between individual sprockets, said guide system including a first and a second guide member thereof movable relative to each other; a shifting mechanism including a shift lever for enabling shifting of said movable carrier to a plurality of shifting positions corresponding with said drive sprockets; a cam member fixedly mounted on said first guide member of said guide system; a cam follower member including a cam follower rotatably mounted on said second guide member of said guide system; transmission means for enabling said cam member and said cam follower member to be moved relative to each other by operation of said shift levers; and additional guide means for maintaining said cam follower member in contact with said cam member during relative movement therebetween thereby to effect movement of said movable carrier member during said relative movement; said transmission means being connected to effect rotation of said cam follower member relative to said first guide member by operation of said shift lever thereby to effect movement of said first guide member of said guide system by engagement of said cam follower member with said cam member; said guide system being formed as a four-member guide system including said second guide member as a frame-mounted carrier member affixed with said bicycle, said movable carrier member connected as a fourth guide member of said guide system, said first guide member pivotally mounted on said second guide member, and a third guide member of said guide system, said first and said third guide members of said guide system being of differing lengths and connected to intersect each other with the first and third guide members at their intersecting point being joined by a first joint and wherein said first and said third guide members in addition are connected with said frame-mounted carrier member by means of a second and third fulcrum, said first and said third guide members being connected with said movable carrier member by a fourth and a fifth fulcrum, respectively, said five fulcrums being designed with two of the fulcrums as sliding joints.

23. A system according to claim 21 or 22 wherein said first guide member (133) having said cam member (139) fixedly mounted thereto is formed with a shorter length than said third guide member (132).

24. A system according to claim 1 wherein said cam follower member (141) is a pulley having said transmission means (127) in the form of a cable (128) connected with the circumference thereof.

25. A system according to claim 1 wherein said cam member (39) together with said first guide member (33) are rotatably mounted relative to said second guide member (23) about a first fulcrum (37), wherein said cam follower member (41) is rotatably mounted relative to said second guide member (23) about a second fulcrum (42), wherein said first (37) and second fulcrum (42) are displaced relative to each other, and wherein the configuration of said cam member (39) and the displacement of said first (37) and said second (42) fulcrums are of such a nature that rotary movement of said cam member (39) about said first fulcrum (37) is identical in direction to rotary movement of said cam follower member (41) around said second fulcrum (42) with the latter movement being operative to cause the former movement.

26. A system according to claim 1 wherein said cam member (39) is movably adjustable relative to said first guide member (33) upon which it is mounted.

27. A system according to claim 1 further comprising elastic pretensioning means (148) operative to maintain said transmission means (127) under constant tension with said tension and said transmission means reacting upon said guide system (122) in such a way that contact between said cam member (139) and said cam follower (143) is maintained.

28. A derailler system for a bicycle including a sprocket system having a plurality of drive sprockets and a chain for driving a wheel of said bicycle at different speeds comprising: a movable carrier member having an idler sprocket rotatably mounted thereon for selectively shifting said chain into engagement individually with said drive sprockets; a guide system for guiding movement of said carrier member along a path essentially parallel with the axis of said sprockets to urge said chain between individual sprockets, said guide system including a first and a second guide member thereof movable relative to each other; a shifting mechanism including a shift lever for enabling shifting of said movable carrier to a plurality of shifting positions corresponding with said drive sprockets; a cam member fixed mounted on said first guide member of said guide system; a cam follower member including a cam follower rotatably mounted on said second guide member of said guide system; transmission means for enabling said cam member and said cam follower member to be moved relative to each other by operation of said shift levers; and additional guide means for maintaining said cam follower member in contact with said cam member during relative movement therebetween thereby to effect movement of said movable carrier member during said relative movement; said transmission means being connected to effect rotation of said cam follower member relative to said first guide member by operation of said shift level thereby to effect movement of said first guide member of said guide system by engagement of said cam follower member with said cam member; said second guide member of said guide system comprising a frame-mounted carrier affixed to said bicycle, said first guide member of said guide system comprising an arm pivotally mounted relative to said second guide member, said guide system further including a third guide member extending generally parallel to said first guide member and also pivotally mounted relative to said second guide member, said movable carrier member comprising a fourth guide member of said guide system pivotally interconnected with both said first and said third guide members thereof.

29. A derailler system for a bicycle including a sprocket system having a plurality of drive sprockets and a chain for driving a wheel of said bicycle at different speeds comprising: a movable carrier member having an idler sprocket rotatably mounted thereon for selectively shifting said chain into engagement individually with said drive sprockets; a guide system for guiding movement of said carrier member along a path essentially parallel with the axis of said sprockets to urge said chain between individual sprockets, said guide system including a first and a second guide member thereof movable relative to each other; a shifting mechanism including a shift lever for enabling shifting of said movable carrier to a plurality of shifting positions corresponding with said drive sprockets; a cam member fixedly mounted on said first guide member of said guide system; a cam follower member including a cam follower rotatably mounted on said second guide member of said guide system; transmission means for enabling said cam member and said cam follower member to be moved relative to each other by operation of said shift levers; and additional guide means for maintaining said cam follower member in contact with said cam member during relative movement therebetween thereby to effect movement of said movable carrier member during said relative movement; said transmission means being connected to effect rotation of said cam follower member relative to said first guide member by operation of said shift lever thereby to effect movement of said first guide member of said guide system by engagement of said cam follower member with said cam member; said cam member being formed with a cam surface defining a number of engaging plateaus with a transitional flank being provided between each of said plateaus, with at least parts of said plateaus being formed as arcs of circles having an identical radius of curvature the central points of which are situated on a circular locus extending about the point at which said first guide member is pivotally connected with said second guide member, the radius of said circular locus corresponding with the distance between the pivot point of said first guide member relative to said second guide member as a common center and the pivot point of said cam follower member relative to said second guide member.

30. A derailler system for a bicycle including a sprocket system having a plurality of drive sprockets and a chain for driving a wheel of said bicycle at different speeds comprising: a movable carrier member having an idler sprocket rotatably mounted thereon for selectively shifting said chain into engagement individually with said drive sprockets; a guide system for guiding movement of said carrier member along a path essentially parallel with the axis of said sprockets to urge said chain between individual sprockets, said guide system including a first and a second guide member thereof movable relative to each other; a shifting mechanism including a shift lever for enabling shifting of said movable carrier to a plurality of shifting positions corresponding with said drive sprockets; a cam member fixedly mounted on said first guide member of said guide system; a cam follower member including a cam follower rotatably mounted on said second guide member of said guide system; transmission means for enabling said cam member and said cam follower member to be moved relative to each other by operation of said shift levers; and additional guide means for maintaining said cam follower member in contact with said cam member during relative movement therebetween thereby to effect movement of said movable carrier member during said relative movement; said transmission means being connected to effect rotation of said cam follower member relative to said first guide member by operation of said shift lever thereby to effect movement of said first guide member of said guide system by engagement of said cam follower member with said cam member; said cam member being formed with a cam surface defining a number of engaging plateaus with a transitional flank being provided between each of said plateaus, with the position of said cam follower relative to said cam member changing as said cam follower moves from one of said plateaus to another of said plateaus, said system including means for temporarily altering the relative positioning of said cam member and said cam follower member to a greater degree than the relative movement effected by passage of said cam follower from one plateau to another plateau.

31. A derailler system for a bicycle including a sprocket system having a plurality of drive sprockets and a chain for driving a wheel of said bicycle at different speeds comprising: a movable carrier member having an idler sprocket rotatably mounted thereon for selectively shifting said chain into engagement individually with said drive sprockets; a guide system for guiding movement of said carrier member along a path essentially parallel with the axis of said sprockets to urge said chain between individual sprockets, said guide system including a first and a second guide member thereof movable relative to each other; a shifting mechanism including a shift lever for enabling shifting of said movable carrier to a plurality of shifting positions corresponding with said drive sprockets; a cam member fixedly mounted on said first guide member of said guide system; a cam follower member including a cam follower rotatably mounted on said second guide member of said guide system; transmission means for enabling said cam member and said cam follower member to be moved relative to each other by operation of said shift levers; and additional guide means for maintaining said cam follower member in contact with said cam member during relative movement therebetween to effect movement of said movable carrier member during said relative movement; said transmission means being connected to effect rotation of said cam follower member relative to said first guide member by operation of said shift lever thereby to effect movement of said first guide member of said guide system by engagement of said cam follower member with said cam member; said guide system comprising a rectangular guide system formed as a parallelogram-type guide member system, said system including four members which are comprised of said second guide member formed as a frame-mounted carrier member affixed with said bicycle, said first guide member pivotally connected with said second guide member and having said cam member affixed thereto, a third guide member pivotally connected at opposite ends thereof between said second guide member and said movable carrier member and said movable carrier member as a fourth guide member of said guide system, said movable carrier member being pivotally interconnected between said first guide member and said third guide member.

32. A derailler system for a bicycle indluding a sprocket system having a plurality of drive sprockets and a chain for driving a wheel of said bicycle at different speeds comprising: a movable carrier member having an idler sprocket rotatably mounted thereon for selectively shifting said chain into engagement individually with said drive sprockets; a guide system for guiding movement of said carrier member along a path essentially parallel with the axis of said sprockets to urge said chain between individual sprockets, said guide system including a first and a second guide member thereof movable relative to each other; a shifting mechanism including a shift lever for enabling shifting of said movable carrier to a plurality of shifting positions corresponding with said drive sprockets; a cam member fixedly mounted on said first guide member of said guide system; a cam follower member including a cam follower rotatably mounted on said second guide member of said guide system; transmission means for enabling said cam member and said cam follower member to be moved relative to each other by operation of said shift levers; and additional means for maintaining said cam follower member in contact with said cam member during relative movement therebetween thereby to effect movement of said movable carrier member during said relative movement; said transmission means being connected to effect rotation of said cam follower member relative to said first guide member by operation of said shift lever thereby to effect movement of said first guide member of said guide system by engagement of said cam follower member with said cam member; said cam follower member being a pulley having said transmission means in the form of a cable connected with the circumference thereof.

33. A derailler system for a bicycle including a sprocket system having a plurality of drive sprockets and a chain for driving a wheel of said bicycle at different speeds comprising: a movable carrier member having a idler sprocket rotatably mounted thereon for selectively shifting said chain into engagement individually with said drive sprockets; a guide system for guiding movement of said carrier member along a path essentially parallel with the axis of said sprockets to urge said chain between individual sprockets, said guide system including a first and a second guide member thereof movable relative to each other; a shifting mechanism including a shift lever for enabling shifting of said movable carrier to a plurality of shifting positions corresponding with said drive sprockets; a cam member fixedly mounted on said first guide member of said guide system; a cam follower member including a cam follower rotatably mounted on said second guide member of said guide system; transmission means for enabling said cam member and said cam follower member to be moved relative to each other by operation of said shift levers; and additional guide means for maintaining said cam follower member in contact with said cam member during relative movement therebetween thereby to effect movement of said movable carrier member during said relative movement; said transmission means being connected to effect rotation of said cam follower member relative to said first guide member by operation of said shift lever thereby to effect movement of said first guide member of said guide system by engagement of said cam follower member with said cam member; said cam member being movably adjustable relative to said first guide member upon which it is mounted.

* * * * *